United States Patent [19]
Cover

[11] 3,942,629
[45] Mar. 9, 1976

[54] APPARATUS FOR ORIENTING ARTICLES HAVING AT LEAST ONE TAPERED END
[75] Inventor: Paul F. Cover, Westminster, Md.
[73] Assignee: The United Company, Westminster, Md.
[22] Filed: Jan. 23, 1975
[21] Appl. No.: 543,624

Related U.S. Application Data
[63] Continuation-in-part of Ser. No. 273,405, July 20, 1972, Pat. No. 3,874,498.

[52] U.S. Cl. ................ 198/254; 198/268; 198/281; 198/285
[51] Int. Cl.[2] ........................................ B65G 47/24
[58] Field of Search ........... 198/248, 249, 252, 253, 198/254, 255, 268, 272, 273, 274, 275, 281, 285, DIG. 12, 236, 165; 221/171, 172

[56] References Cited
UNITED STATES PATENTS
3,224,552  12/1965  McNeill .......................... 198/253 X
3,623,592  11/1971  Van Melle .......................... 198/253

Primary Examiner—Evon C. Blunk
Assistant Examiner—Douglas D. Watts
Attorney, Agent, or Firm—Diller, Brown, Ramik & Wight

[57] ABSTRACT

This disclosure relates to an apparatus for orienting elongated objects each of which is tapered at one end and has a larger end opposite thereto, the apparatus including a curved guide surface forming a transition path between a pair of conveyors with a gap between the curved guide surface and a support through which might pass tapered or larger ends of objects, first means for abuttingly contacting the larger ends of the objects to deposit the same with the larger ends thereof leading upon the second conveyor, means for contacting the tapered ends passing through the gap for again depositing the objects with the larger ends leading upon the second conveying means, the second conveyor means having movable belts diverging toward an exit end thereof, and means adjacent the exit end portion against which larger end objects leading on the second conveying means are deposited upon third conveying means with the tapered ends leading while objects with the tapered ends leading on the second conveying means are deposited with the same ends leading on the third conveying means.

32 Claims, 9 Drawing Figures

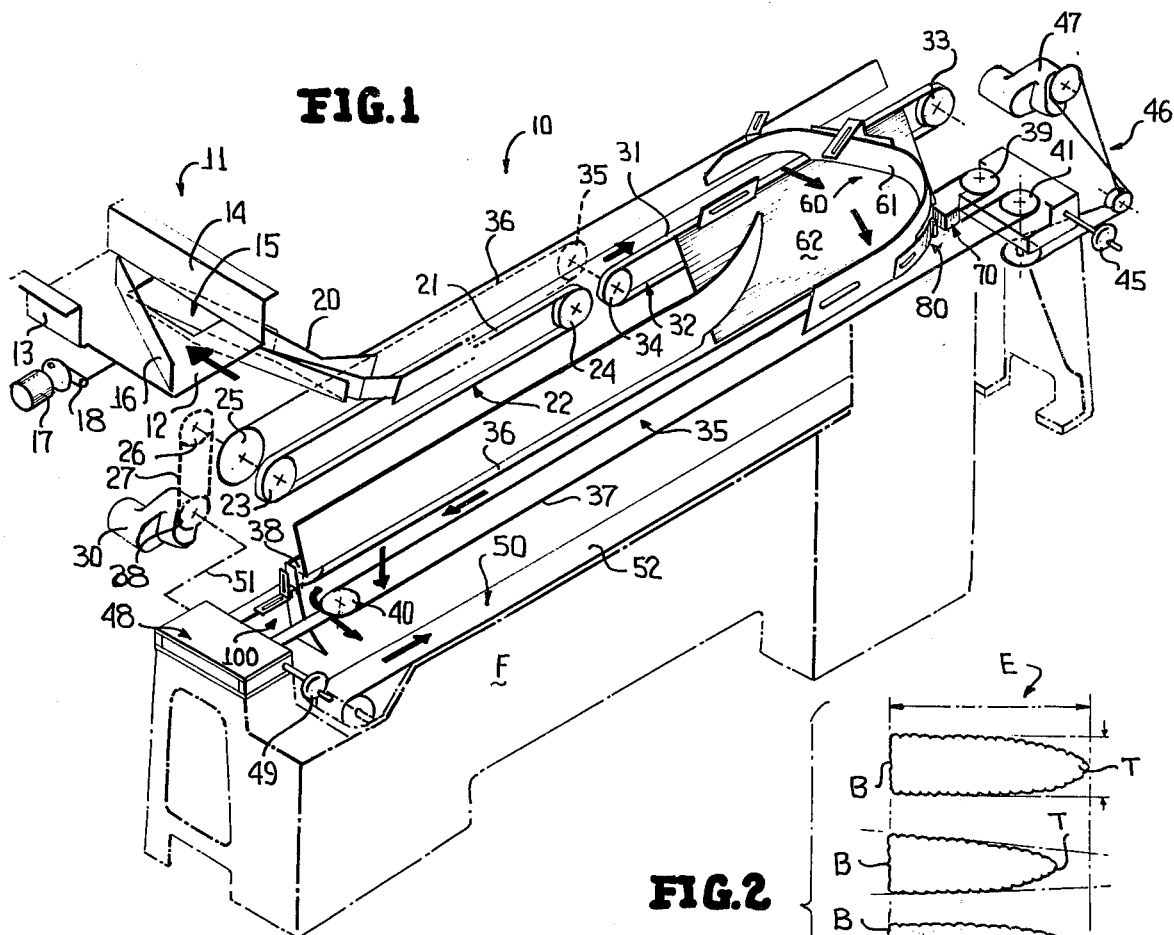
FIG.1
FIG.2
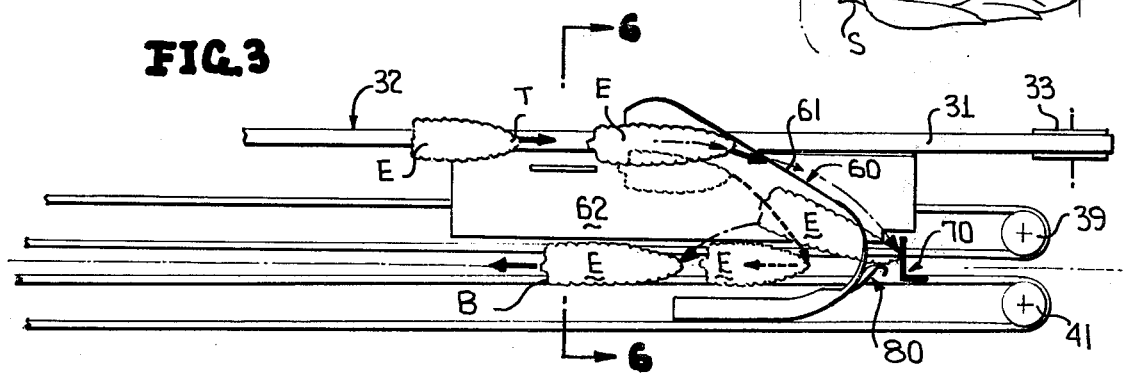
FIG.3
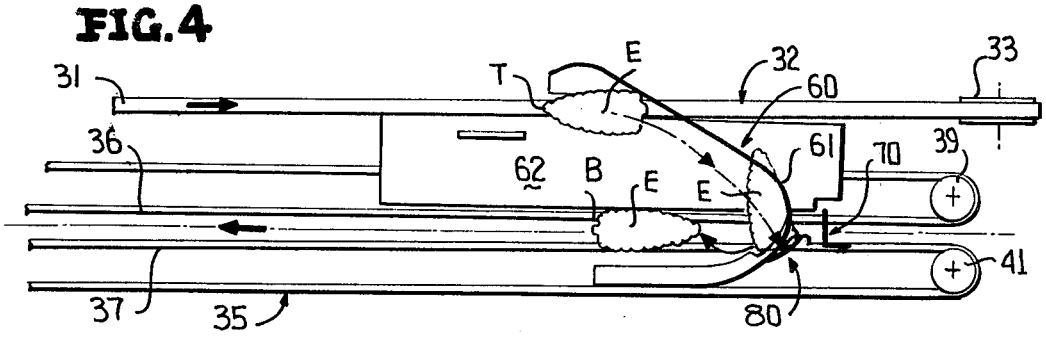
FIG.4

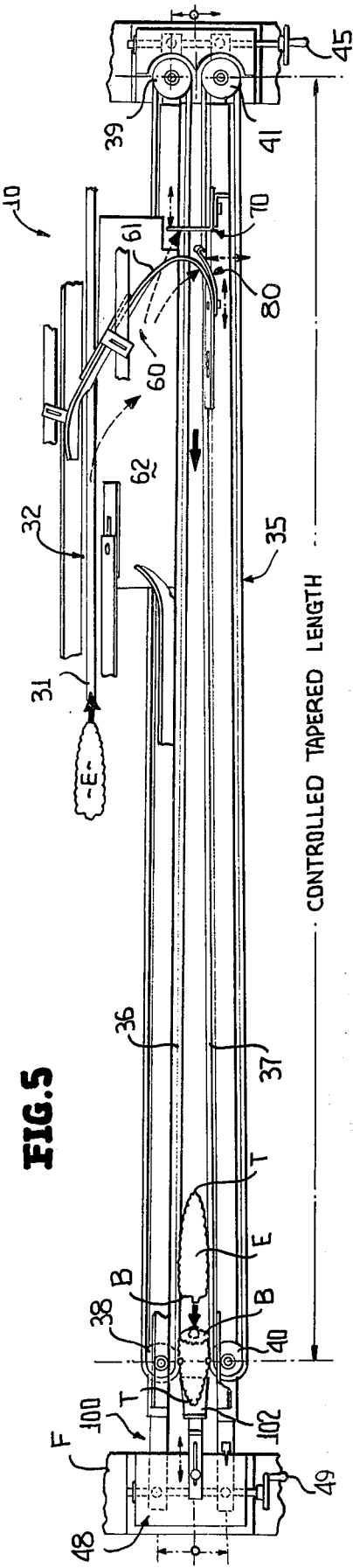
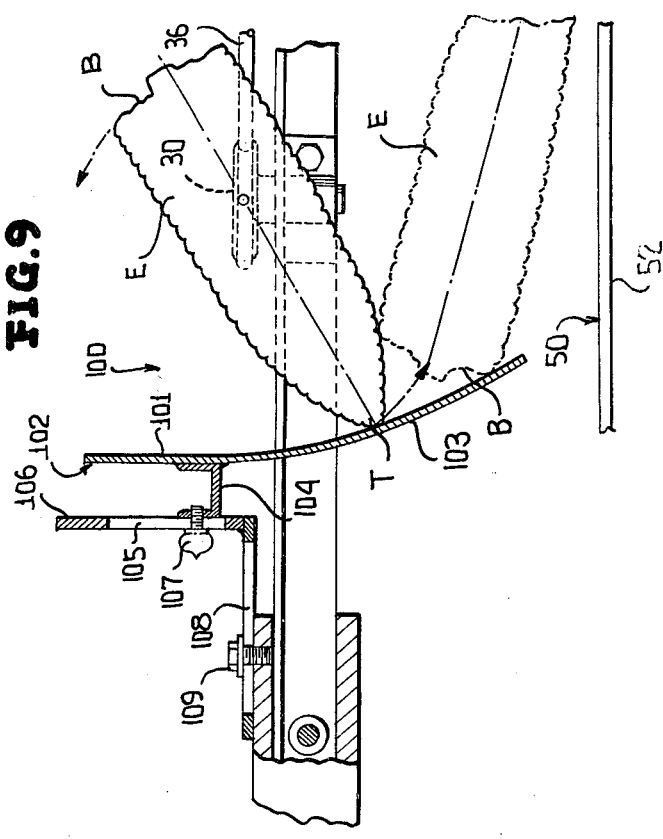
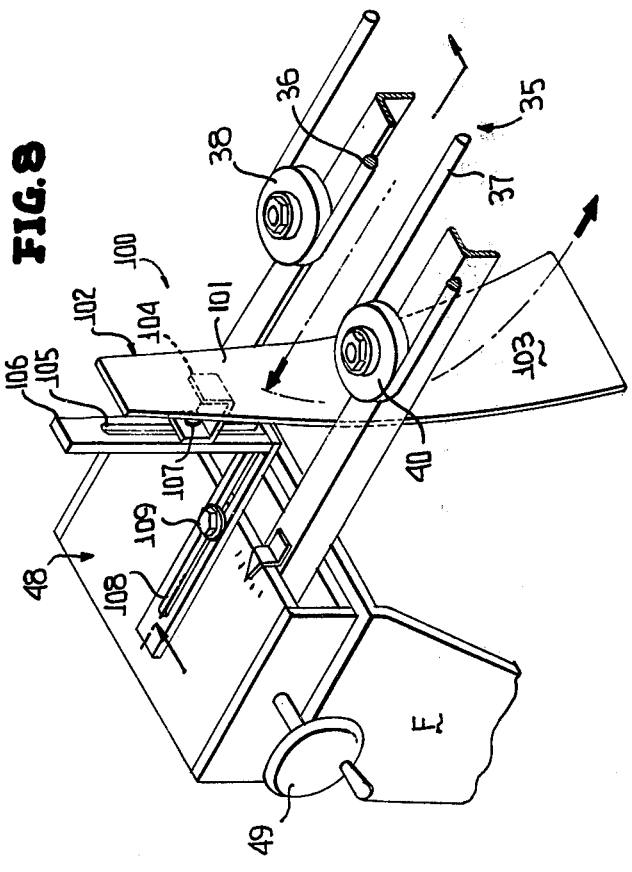

APPARATUS FOR ORIENTING ARTICLES HAVING AT LEAST ONE TAPERED END

This application is a continuation-in-part application of commonly assigned application Ser. No. 273,405 in the name of Paul F. Cover et al. filed July 20, 1972, entitled APPARATUS FOR AND METHOD OF ORIENTING ARTICLES HAVING AT LEAST ONE TAPERED END, and now U.S. Pat. No. 3,874,498.

The present invention is specifically directed to apparatus for orienting elongated objects which have one tapered end, such as corn whether husked or unhusked, butted or unbutted, although the apparatus is equally adapted to orient other articles, such as carrots, textile bobbins, etc.

Though orienting apparatuses for partially tapered or fully tapered articles are known, most are acceptable only if the objects to be oriented are of exceptionally uniformed contour and condition. Unique problems develop when the objects to be oriented are ears of husked or unhusked, butted or unbutted corn which are fed to most commerical machinery with the tapered ends thereof leading. For example, husked and unhusked ears of corn can be fed to conventional huskers, and cutters, respectively, tip end or tapered end first which is particularly more desirable in the case of cutters to obtain optimum kernel removal per ear of corn. However, irrespective of the particular end which is fed to the processing machinery various factors must be contended with if corn or similar produce are to be properly fed to the processing machinery as, for example, variations in diameter, length, taper, etc., depending upon growing conditions, seasonal variations, different varieties of the same product, mutations, and the like. Even assuming absolute uniformity of contour, there is ample variety to create problems simply because of such conditions as non-uniformity of field conditions and the usual damage to the corn ears between picking and the subsequent transporting, storing, conveying and eventual processing.

In keeping with the foregoing the latter-identified application defines a machine which adequately orients corn ears of generally constant and uniformed shape, size, form, etc. However, under actual conditions of operation it has been found that different lengths of corn, variations in the contour there, whether the same are husked or unhusked, whether the same are butted or unbutted, or the like have introduced variables into the orienting system which without solution could under less than optimum conditions preclude a desired high percentage of acceptable orientation.

It is therefore a primary object of the present invention to provide a novel orienting apparatus or machine which though common in structure in several aspects to that disclosed in the latter-noted application includes improvements which assure that under almost all conditions of the product to be oriented optimum orientation will be achieved.

The present invention includes, as in the machine of the latter-mentioned application, a pair of conveyors in side-by-side relationship but at different elevations with a curved guiding surface therebetween as well as an inclined support with the latter two elements defining a gap through which short butt end leading ears may partially pass as might be tip end leading ears the improvement comprising means for contactingly guiding the butt end leading ears to turn the same and direct or dispose the thus guided ears upon a conveyor with the butt end leading, as well as means for abutting the tip end of ears to likewise deposit such ears upon the second conveyor with the butt ends leading.

A further object of this invention is to provide a novel machine of the type immediately heretofore described wherein the means for contacting the butt end leading ears is a curved guide surface which may be adjusted relative to the direction of travel of the second conveyor or in a direction opposite thereto for accommodating different lengths of corn ears.

Still another object of this invention is to provide a machine of the type heretofore described wherein the tip end abutment means is simply a variably adjustable plate for likewise accommodating corn ears of different lengths.

A further object of this invention is to provide novel improvements in orienting machines of the type described wherein the second conveyor means includes a pair of continuous belts having entrance end and exit end portions with the adjacent flights of the belts diverging in a direction toward the exit end whereby, depending upon the ends leading, will be properly oriented and deposited upon a third conveyor.

A further object of this invention is to provide a novel apparatus of the type latter set forth wherein a transition zone is provided between the exit end portion of the second conveyor and the third conveyor, the transition zone being in the form of an abutment and guide plate disposed in generally a vertical plane such that ears traveling butt end first on the second conveyor abut the plate and are deposited upon the third conveyor with the tapered ends leading whereas cars traveling with the tapered ends leading on the second conveyor pivot in the tapered portion of the exit end portion of the second conveyor belts and upon contacting the guide surface are guided such that the tapered ends lead when deposited upon the third conveyor.

With the above and other objects in view that will hereinafter appear, the nature of the invention will be more clearly understood by reference to the following detailed description, the appended claimed subject matter, and the several views illustrated in the accompanying drawings.

IN THE DRAWINGS

FIG. 1 is a schematic perspective view of a novel orienting apparatus or machine constructed in accordance with this invention and illustrates three conveyors with orienting means between or formed as a portion of each.

FIG. 2 is a side elevational view of different types of ears which can be successfully oriented by the machine of FIG. 1, and illustrates from top to bottom a relatively long husked and butted ear, a relatively short and substantially totally tapered husked and butted ear, a husked and unbutted ear, and an unhusked and unbutted ear.

FIG. 3 is a fragmentary schematic top plan view of the orienting machine of FIG. 1, and illustrates the manner in which relatively long and relatively short ears are oriented between first and second conveyors such that the butt ends are leading on the second conveyor.

FIG. 4 is a view similar to FIG. 3, and illustrates the manner in which a relatively small diametered butt end leading ear is oriented to likewise lead with its butt end on the second conveyor.

FIG. 5 is a top plan view along the length of the second conveyor, and illustrates the manner in which adjacent runs of a pair of belts diverge in a direction toward an exit end portion thereof for orienting purposes.

FIG. 8 is a fragmentary perspective view of the exit end portion of the second conveyor, and illustrates abuttment means in the form of a partially curved plate disposed in a vertical plane for augmenting the proper transtion of ears from the second conveyor upon the third conveyor with the tapered ends leading.

FIG. 9 is a fragmentary sectional view taken generally along line 9—9 of FIG. 8, and illustrates the manner in which the abutment means facilitates the transition of a tip end leading object from the second conveyor to likewise become disposed on the third conveyor with its tip or tapered end leading.

Figure 6:
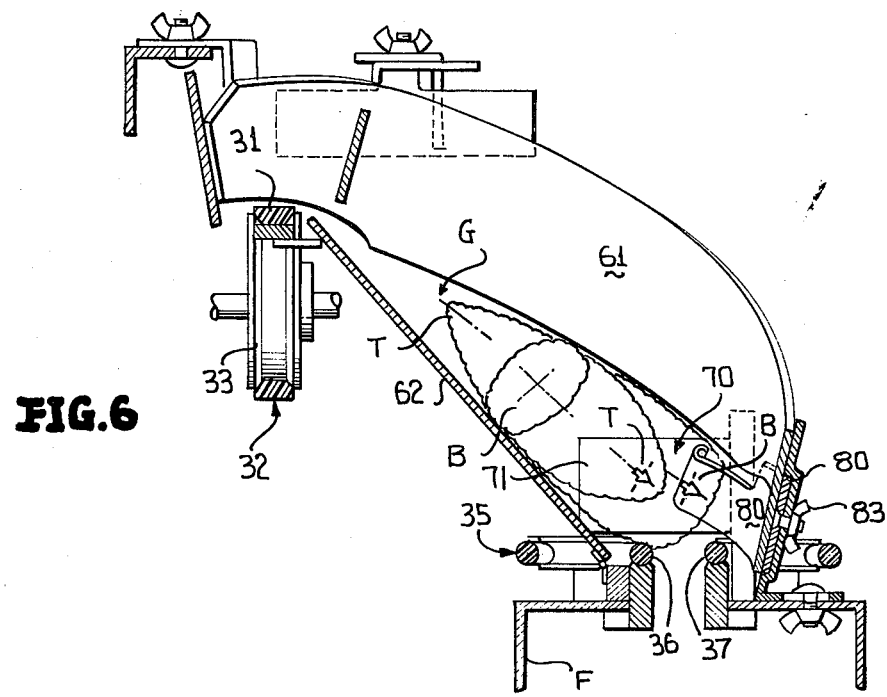
FIG. 6 is an enlarged sectional view taken generally along line 6—6 of FIG. 3, and more specifically illustrates the manner in which ears or similar tapered objects are oriented during the transition between first and second conveyors.

A novel orienting apparatus or machine constructed in accordance with this invention in generally designated by the reference numeral 10 (FIG. 1) and includes a chute or like conveyor 11 for conveying a mass of objects, such as ears E of corn having tapered or tip ends T and butt ends B of a generally non-tapered or generally cylindrical configuration which may be shankless or have shanks S (FIG. 2). The ears may be butted, as illustrated by the top two ears E in FIG. 2, unbutted or husked as indicated by the third ear from the top in FIG. 2, or both unhusked and shanked, as illustrated by the lowermost ear in FIG. 2.

The conveying means 11 is in the form of a conveyor trough of a generally U-shaped configuration having a bottom wall 12 and a pair of upstanding side walls 13, 14. The bottom wall 12 includes means for singularizing the ears E of corn, the singularizing means being generally designated by the reference numeral 15 and being formed by an aperture (unnumbered) of a generally rectangular shape into which the articles of objects E are directed by an adjacent gate 16 upon the vibration of the conveyor 11 through the energization of the conventional motor 17 whose output shaft (unnumbered) is connected to a crank 18 through a eccentric coupled in turn conventionally to the conveyor 11. Thus, the eccentric mounting of the crank arm 18 imparts reciprocal vibratory motion to the conveyor 11 resulting in the feed of the objets in the direction of the unnumbered arrow associated with the conveyor 11 toward and individually into the opening 15 guided thereinto by the gate or deflector 16.

After each object or ear E of corn passes through the opening 15 it slides down a chute 20 which includes a bottom wall and a pair of side walls (unnumbered) constructed from relatively flexible metallic material. The guides of the chute 20 are suitably welded or otherwise secured to a frame F of the machine 10 and direct the ears E upon an upper flight 21 of a conveyor 22 journaled about respective drive and idler pulleys 23, 24. The drive pulley 23 has its shaft (unnumbered) connected to a drive sprocket 25 as well as to a sprocket 26 having entrained thereabout a chain 27 which is in turn entrained about a drive sprocket 28 driven from a conventional motor 30 through reduction gearing (unnumbered). Thus, upon the energization of the motor 30 the upper flight 21 of the conveyor 22 is driven from left-to-right, as viewed in FIG. 1.

Following the conveyor 22 is another conveyor 32 having an upper flight 31 which is slightly lower and spaced from the upper flight 21 of the conveyor 22 to prevent choking in the manner described in the latter-mentioned application. The conveyor 32 is entrained about an idler pulley 33 and a drive pulley 34, respectively, and the latter pulley includes a shaft (unnumbered) keyed to a sprocket 35 about which is entrained a drive chain 36. The drive chain 36 is also entrained about the sprocket 25 and thus rotation imparted to the latter drives the upper run 31 of the conveyor 32 from left-to-right, as viewed in FIG. 1.

Another conveyor, generally designated by the reference numeral 35, is located transversely adjacent to and below the upper flights 21, 31 of the conveyors 22, 32, respectively. The conveyor 35 includes a pair of endless conveyor belts or tapes 36, 37 which are entrained about respective pulleys 38, 39 and 40, 41. The inner runs (unnumbered) of the belts 36, 37 diverge in a direction away from each other from an entrance end portion (unnumbered) of the conveyor 35 adjacent the pulleys 39, 41 toward an exit end portion (also unnumbered) adjacent the pulleys 38, 40. The shafts (unnumbered) of the pulleys 39, 40 correspond to the pulleys 93, 94 of the latter-mentioned application and are suitably coupled for motion toward or away from each other upon the rotation of a hand wheel 45 to vary the distance between the intermost runs of the conveyor belts 36, 37 at the entrance end portion of the conveyor 35, in the manner more particularly described in the latter-mentioned application. Suitable sprockets, drive belts or chains and gearing, generally designated by the reference numeral 46 are coupled between a conventional electrical motor 47 and the pulleys 39, 41 to impart rotation thereto such that the inner runs of the flights of the conveyor belts 36, 37 move from right-to-left, as viewed in FIG. 1. The pulleys 38, 40 are also carried by shafts which through a mechanism 48 operated by the rotation of a hand wheel 49 can move the pulleys 38, 40 relatively toward or away from each other to vary the distance at the exit end portion with once again the specific details of the adjusting mechanism 48 being generally the same as those depicted in FIGS. 15 and 16 of the latter-mentioned application.

A final conveyor 50 directly underlies the conveyor 35 and is suitably mounted for rotation upon pulleys (unnumbered) journaled for rotation in the frame F. A take-off 51 from the shaft of the motor 30 is coupled to a drive pulley (unnumbered) of the conveyor 50 such that its upper flight 52 moves from left-to-right in FIG. 1. The conveyor 50 may be a chain feed device, a flexible conveyor, or any type feed mechanism for directing the objects carried upon the upper flight 52 thereof toward and/or into a processing machine, such as a corn cutter, a husker, etc.

Orienting means, generally designated by the reference numeral 60 are provided in a transition zone between the upper flight 31 of the conveyor 32 and the entrance end portion of the conveyor 35. The orienting means 60 includes a curved guide or guide surface 61 mounted for relative adjustment upon the frame F in the manner disclosed in the latter-noted application. A steeply inclined plate 62 defines with the curved guide plate a gap G (FIG. 6) through which might at least partially pass ears E, depending upon the particular end of each ear leading and the particular size and shape thereof.

Figure 7:
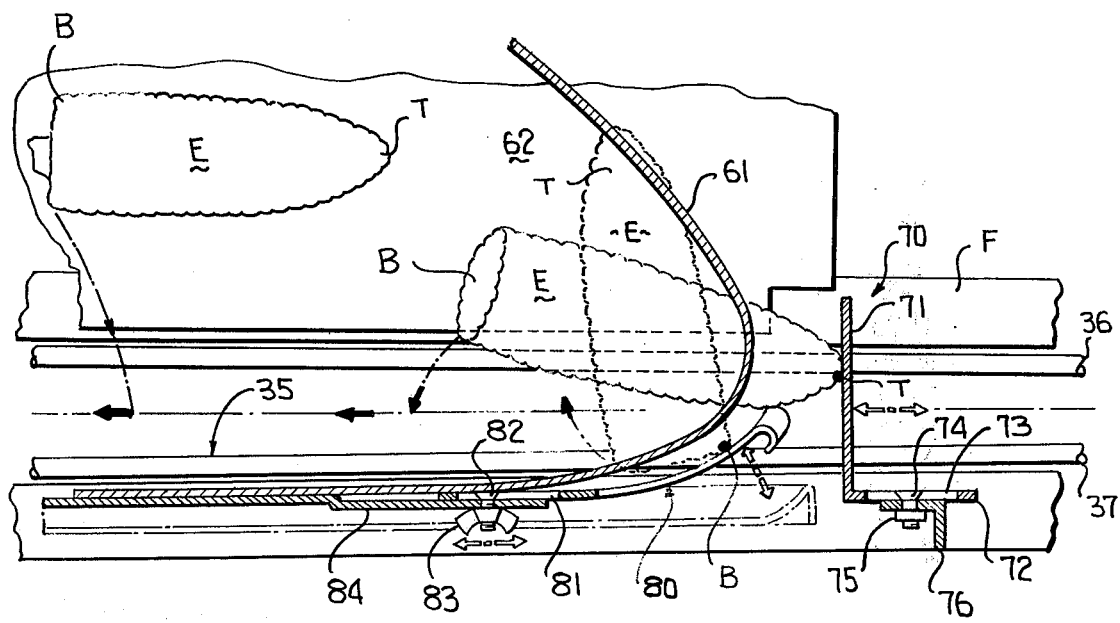
FIG. 7 is a fragmentary top plan view partially in cross-section looking downwardly in FIGS. 4 and 6, and details the manner in which small diametered butt end leading and tapered end leading objects are oriented during the transition between the first and second conveying means.

It has been found that ears with the tip or tapered ends leading on the upper flight 31 of the conveyor 32 will pass at least partially through the gap G prior to being influenced by the opposite moving direction of the conveyor 35 and to assure that such ears are disposed or deposited upon the conveyor belts 36, 37 with the butt ends leading abutment means, generally designated by the reference numeral 70 are provided to the right of the gap, as viewed in FIG. 7, which is upstream of the direction of travel of the innermost flights of the conveyor belts 35, 36. The abutment means 70 is an angle iron or plate having a pair of arms 71, 72 with the arm 71 spanning a portion of the gap G, as is best illustrated in FIG. 6. The remaining arms 72 has an elongated slot 73 through which may pass a bolt 74 threaded thereupon a nut 75. The bolt 74 passes through an aperture in an angle member 76 fixed to the frame F of the machine 10. By loosening the nut 75 the abutment means 70 can be shifted to the right or to the left as shown in FIG. 7 and fixed in such an adjusted position by simply retightening the nut 75. The shifting thus described varies the distance of the arms 71 from the gap G and thus accommodates for ears E of corn of random lengths to assure that all ears whose tip passes through the gap G and contacts the arms 71 of the abutment means 70 will be deposited upon the innermost flights of the conveyors 36, 37 for right-to-left conveyance thereby, as viewed in FIGS. 1 and 7.

Second guide means also in the form of an arcuate or curved guide plate or surface 80 is positioned generally between the curved guide plate 61 and the arm 71 and also projects partially into the gap G (FIG. 6). The curved guide plate also includes an elongated slot 81 through which passes a bolt 82 having threaded thereupon a wing nut 83. The bolt 82 also passes through an aperture in a plate 84 secured to the frame F of the machine 10. The slot 81 permits the plate 80 to be shifted to the left or toward the right, as viewed in FIG. 7, to decrease or increase, respectively, the distance between the plates 61, 80. This adjustment again accommodates the machine for ears of varying lengths. However, generally ears E with the butt ends leading on the upper flight 31 of the conveyor 32 will be guided by the plate 61 but at times due to a smaller diameter at the larger end thereof will partially pass into and through the gap G and in so doing will contact the plate 80 and will be guided thereby in the manner indicated by the unnumbered headed arrow associated therewith such that such shorter ears are deposited with their butt ends leading upon the adjacent flights of the conveyor belts 36, 37.

At times shorter ears, which have their tapered ends leading on the upper run 31 of the conveyor 32 may tend simply to roll down the incline 62, as indicated by the left hand uppermost ear in FIG. 7 to also be deposited upon the upper flights of the conveyors 36, 37.

Other ears which are leading tapered ends first on the upper run 31 of the conveyor 32 and which are guided continually by the guide surface or plate 61 without entering the gap G are disposed butt end leading upon the conveyor 35 in the manner described relative to FIG. 4 in the latter-noted application. Likewise, longer and diametrically larger ears of corn which are butt end leading on the upper flight 31 of the conveyor 32 rotate clockwise, as viewed in FIGS. 1 and 7, as they roll down the incline surface 62 and are deposited butt end leading upon the conveyor 35 as described relative to FIG. 6 in the latter-mentioned application.

Unhusked ears E will be oriented by the means 60, 70 and 80 in the same manner heretofore described, be they shank or shankless, as will husked by unshanked ears of corn. However, unhusked corn has more irregularities than husked corn due primarily to the fact that the husk leaves and corn silk are still thereon, and therefore the adjustment provided for the means 70, 80 is of a more critical nature than might otherwise be the case with husked ears. Rarely are husked and unhusked ears oriented simultaneously and therefore with proper adjusting of the means 60, 70 and 80 a comingling of the three uppermost illustrated husked ears and variation thereof can be oriented with success by the means 60, 70 and 80, as can be the lowermost shanked and unhusked ears of FIG. 2.

Of course, not all ears E will depart from the means 60, 70, 80 and be deposited upon the adjacent flights of the conveyor belts 36, 37 with their butt ends leading, as is desired. However, to assure that virtually all ears E are deposited upon the conveyor 50 with the tapered ends or tips leading further orienting means, generally designated by the reference numeral 100 (FIGS. 8 and 9) are provided and in part formed by the exit end portion (unnumbered) of the conveyor 35. By adjusting the relative distance between the pulleys 38, 40 the gap between the innermost runs of the conveyor belts 36, 37 can be varied, as was earlier noted and by and large all ears traveling butt first with the conveyor 35 simply drop directly downwardly upon the conveyor 32 when the major diameter of the ear E can no longer be gripped between the innermost runs of the conveyor belts 36, 37. This transfer of the butt leading ears from the conveyor 35 to the conveyor 50 occurs in the manner described in the latter-noted application relative to the ears P11, P12 of FIG. 5. However, should a relatively abnormally large diametered ear traveling butt first upon the conveyor 35 not drop therethrough the butt end will be carried by momentum against an abutment surface 101 of a plate 102 of the means 100 (FIG. 9) and at this point the trailing tapered end will have well cleared the innermost runs of the belts 36, 37, and upon rebound of the ear from against the plate 101 the tip end thereof will be directly downwardly and to the right as viewed in FIG. 9 for tip end leading deposited upon the conveyor 50.

Should tip end leading ears approach the pulleys 38, 40 they will tend to pivot about a transverse or horizontal axis, in the manner indicated by the uppermost illustrated ear in FIG. 9. The tips thereof will be brought into contact with a curve portion 103 of the plate 102 and under the continued influence of the belts 36, 37 the pivoting action illustrated will be continued and augmented driving the tips along the curve surface 103 in a direction downward and to the right, as viewed in FIG. 9, whereupon each ear so originally leading with its tip end on the conveyor 35 will also lead with its tip end on the upper run 52 of the conveyor 50.

Depending, of course, upon primarily the length of the ears E the plate 102 is mounted for adjustment toward and away from the exit end portion (unnumbered) of the conveyor 35. The plate 102 is further mounted for vertical adjustment to position the curved portion 103 of the plate 102 at a desired vertical location, again depending upon the length and other characteristics of the ears E. The mounting for the plate 102 consists of a bracket 104 vertically slidably adjusted in a slot 105 of another bracket 106 and fixed at a desired position by a suitable wing bolt 107. The bracket 106 likewise includes a slot 108 through which passes a bolt 109 threaded in a portion of the frame F. Thus, by tightening or loosening the bolts 107 and/or 109 the vertical and horizontal adjustment, respectively, of the plate 102 can be effected.

It is also pointed out that though the lengths of the ears E may vary concern must equally be given to the fact that the diameters of the ears E are of concern, particularly since in most cases both long and short ears with the tip or tapered ends leading will pass through the gap G and abut the means 70 to be deposited upon the conveyor 35 with the butt ends thereof leading. However, when ears leading butt end first from the conveyor 32 pass along the plate 61 toward the progressively opening gap G the butt ends will pass through the gap G and contact the plate 80 only if, of course, the butts are small enough to enter into and through the gap G. Otherwise, such butt end leading ears E which are larger than the widest opening of the gap G will simply be oriented in the manner heretofore described relative to the earlier-mentioned application.

In further accordance with this invention the plate 80 may also not only be shifted left-to-right and vice versa, as viewed in FIGS. 1 and 7, but the plate 80 may also be bent to a different curvature toward or away from the plate 61 depending, of course, upon the particular diameters and/or lengths of the ears of corn contacting the plate 80 butt end first.

While preferred forms and arrangements of parts have been shown in illustrating the invention, it is to be clearly understood that various changes in detail and arrangement of parts may be made without departing from the spirit and scope of this disclosure.

I claim:

1. Apparatus for orienting elongated objects of random lengths each of which is normally tapered at one end and has a larger end remote from the tapered end comprising first means for conveying said objects randomly with different ends leading along a first generally horizontal path in a first direction, second means for conveying said objects along a second generally horizontal path in a second direction opposite and generally parallel to said first direction, means between said first and second conveying means for orienting said objects such that substantially all objects conveyed by said second conveying means have like contoured ends leading, said orienting means including means defining a first curved guide surface forming a transition path between said first and second conveying means for contactingly guiding the tapered ends of objects to cause the larger ends of the thus guided objects to be deposited upon said second conveying means with the larger ends thereof leading, and said orienting means further including means defining a second curved guide surface adjacent said second conveying means disposed at least partially upstream of the first curved guide surface relative to the direction of travel of said second conveying means for contactingly guiding enlarged ends of objects which pass beyond said first curved guide surface to cause the larger ends of the thus guided objects to be deposited upon said second conveying means with the larger ends thereof leading.

2. The apparatus as defined in claim 1 including means for supporting said objects during the movement thereof between said first and second conveying means, a gap between said supporting means and said first curved guide surface through which may at least partially pass the larger ends of the objects, and said second curved guide surface being disposed adjacent said gap for contactingly intercepting objects passing through said gap incident to depositing said intercepted objects upon said second conveying means with the larger ends thereof leading.

3. The apparatus as defined in claim 1 wherein said second curved guide surface is a resilient element which upon contact by the larger ends of objects will initially deflect and subsequently rebound to impart a turning force to said last-mentioned objects to dispose the latter with their larger ends leading upon said second conveying means.

4. The apparatus as defined in claim 1 including means for selectively adjusting the position of said second curved guide surface in the direction of the path of travel of said second conveying means and opposite thereto.

5. The apparatus as defined in claim 2 wherein said supporting means in a supporting surface inclined downwardly in a direction from said first conveying means toward said second conveying means.

6. The apparatus as defined in claim 1 wherein said second curved guide surface is a resilient element which upon contact by the larger ends of objects will initially deflect and subsequently rebound to impart a turning force to said last-mentioned objects to dispose the latter with their larger ends leading upon said second conveying means, and said first and second conveying means are transversely offset relative to each other in side-by-side relationship of different elevations.

7. The apparatus as defined in claim 2 wherein said second curved guide surface is a resilient element which upon contact by the larger ends of objects will initially deflect and subsequently rebound to impart a turning force to said last-mentioned objects to dispose the latter with their larger ends leading upon said second conveying means.

8. The apparatus as defined in claim 2 including means for selectively adjusting the position of said second curved guide surface in the direction of the path of travel of said second conveying means and opposite thereto.

9. The apparatus as defined in claim 5 including means for selectively adjusting the position of said second curved guide surface in the direction of the path of travel of said second conveying means and opposite thereto.

10. Apparatus for orienting elongated objects of random lengths each of which is normally tapered at one end and has a larger end remote from the tapered end comprising first means for conveying said objects randomly with different ends leading along a first generally horizontal path in a first direction, second means for conveying said objects along a second generally horizontal path in a second direction opposite and generally parallel to said first direction, means between said first and second conveying means for orienting said objects such that substantially all objects conveyed by said second conveying means have like contoured ends leading, said orienting means including means defining a first curved guide surface forming a transition path between said first and second conveying means for contactingly guiding the tapered ends of objects to cause the larger ends of the thus guided objects to be deposited upon said second conveying means with the larger ends thereof leading, and said orienting means further including abutment means adjacent said second conveying means disposed upstream of said first curved guide surface relative to the path of travel of said second conveying means for abuttingly contacting the tapered ends of objects which pass beyond said first curved guide surface to cause the larger ends of the thus contacted objects to be deposited upon said second conveying means with the larger ends thereof leading.

11. The apparatus as defined in claim 10 including means for supporting said objects during the movement thereof between said first and second conveying means, a gap between said supporting means and said first curved guide surface through which may at least partially pass the tapered ends of the objects, and said abutment means being disposed adjacent said gap for abutting intercepting objects passing through said gap incident to depositing said abutted objects upon said second conveying means with the larger ends thereof leading.

12. The apparatus as defined in claim 10 wherein said orienting means further includes means defining a second curved guide surface adjacent said second conveying means disposed at least partially upstream of the first curved guide surface relative to the path of travel of said second conveying means for contactingly guiding the enlarged ends of objects which pass beyond said first curved guide surface to cause the larger ends of the thus guided objects to be deposited upon said second conveying means with the larger ends thereof leading.

13. The apparatus as defined in claim 10 including means for selectively adjusting the position of said abutment means in the direction of the path of travel of said second conveying means and opposite thereto.

14. The apparatus as defined in claim 11 wherein said supporting means is a supporting surface inclined downwardly in a direction from said first conveying means toward said second conveying means.

15. The apparatus as defined in claim 11 wherein said second curved guide surface is a resilient element which upon contact by the larger ends of objects will initially deflect and subsequently rebound to impart a turning force to said last-mentioned objects to dispose the latter with their larger ends leading upon said second conveying means, and said first and second conveying means are transversely offset relative to each other in side-by-side relationship of different elevations.

16. The apparatus as defined in claim 11 wherein said orienting means further includes means defining a second curved guide surface adjacent said second conveying means disposed at least partially upstream of the first curved guide surface relative to the path of travel of said second conveying means for contactingly guiding the enlarged ends of objects which pass beyond said first curved guide surface to cause the larger ends of the thus guided objects to be deposited upon said second conveying means with the larger ends thereof leading.

17. The apparatus as defined in claim 16 wherein said supporting means is a supporting surface inclined downwardly in a direction from said first conveying means toward said second conveying means.

18. The apparatus as defined in claim 16 wherein said second curved guide surface is a resilient element which upon contact by the larger ends of objects will initially deflect and subsequently rebound to impart a turning force to said last-mentioned objects to dispose the latter with their larger ends leading upon said second conveying means, and said first and second conveying means are transversely offset relative to each other in side-by-side relationship of different elevations.

19. Apparatus for orienting elongated objects each of which is normally tapered at one end and has a larger end remote from the tapered end comprising first means for conveying said objects randomly with different ends leading along a first generally horizontal path in a first direction, second means below said first conveying means for conveying said objects along a second generally horizontal path in a second direction opposite to said first direction, said first conveying means having an entrance end portion upon which objects are deposited and an exit end portion from which objects are discharged, said first conveying means including a pair of laterally spaced movable supports which diverge in a direction toward said exit end portion whereby objects moving tapered ends first will pivot downwardly and become deposited upon said second conveying means with their tapered ends leading, and abutment means at said exit end portion against which will abut the larger ends of larger end leading objects on said first conveying means for stopping of said last-mentioned objects in their movement in said first direction and depositing said last-mentioned articles on said second conveying means with the tapered ends thereof leading.

20. The apparatus as defined in claim 19 wherein said abutment means includes a curved surface defining a transition path of travel in a generally vertical plane between said exit end portion and said second conveying means.

21. Apparatus for orienting elongated objects each of which is normally tapered at one end and has a larger end remote from the tapered end comprising first means for conveying said objects randomly with different ends leading along a first generally horizontal path in a first direction, second means for conveying said objects along a second generally horizontal path in a second direction opposite and generally parallel to said first direction, third means for conveying said objects along a third generally horizontal path in a third direction opposite to said second direction, said second conveying means being disposed above said third conveying means, first means between said first and second conveying means for orienting said objects such that substantially all objects conveyed by said second means along said second path have like contoured ends leading, and second means for orienting objects during their transition between said second and third conveying means such that those objects with said like contoured ends leading during movement by said second conveying means are conveyed with their opposite ends leading during movement by said third conveying means while objects with their opposite ends leading during movement by said second conveying means are also conveyed with their opposite ends leading during movement by said third conveying means.

22. The apparatus as defined in claim 21 wherein said first orienting means includes means defining a first guide surface forming a transition path between said first and second conveying means for contactingly guiding the tapered ends of objects to cause the larger ends of the thus guided objects to be deposited upon said second conveying means with the larger ends thereof leading, and said first orienting means further includes means defining a second curved guide surface adjacent said second conveying means disposed at least partially upstream of the first curved guide surface relative to the direction of travel of said second conveying means for contactingly guiding the enlarged ends of objects which pass beyond said first curved guide surface to cause the larger ends of the thus guided objects to be deposited upon said second conveying means with the larger ends thereof leading.

23. The apparatus as defined in claim 21 wherein said second orienting means includes abutment means adjacent said second conveying means disposed upstream of said first curved guide surface relative to the path of travel of said second conveying means for abuttingly contacting the tapered ends of objects which pass beyond said first curved guide surface to cause the larger ends of the thus contacted objects to be deposited upon said second conveying means with the larger ends thereof leading.

24. The apparatus as defined in claim 21 wherein said second conveying means has an entrance end portion upon which objects are deposited and an exit end portion from which objects are discharged, said second conveying means include a pair of laterally spaced movable supports which diverge in a direction toward said exit end portion whereby objects moving tapered end first will pivot downwardly and become deposited upon said third conveying means with their tapered ends leading, said diverging movable supports define said second orienting means, and abutment means at said exit end portion against which will abut the larger ends of larger end leading objects on said second conveying means for stopping of said last-mentioned objects in their movement and depositing the same on said third conveying means with the tapered ends thereof leading.

25. The apparatus as defined in claim 21 wherein said second conveying means has an entrance end portion upon which objects are deposited and an exit end portion from which objects are discharged, said second conveying means include a pair of laterally spaced movable supports which diverge in a direction toward said exit end portion whereby objects moving tapered ends first will pivot downwardly and become deposited upon said third conveying means with their tapered ends leading, said diverging movable supports define said second orienting means, abutment means at said exit end portion against which will abut the larger ends of larger end leading objects on said second conveying means for stopping of said last-mentioned objects in their movement and depositing the same on said third conveying means with the tapered ends thereof leading, and said abutment means includes a curved surface defining a transition path of travel in a generally vertical plane between said exit end portion, and said third conveying means.

26. The apparatus as defined in claim 22 wherein said second orienting means includes abutment means adjacent said second conveying means disposed upstream of said first curved guide surface relative to the path of travel of said second conveying means for abuttingly contacting the tapered ends of objects which pass beyond said first curved guide surface to cause the larger ends of the thus contacted objects to be deposited upon said second conveying means with the larger ends thereof leading.

27. The apparatus as defined in claim 22 wherein said second conveying means has an entrance end portion upon which objects are deposited and an exit end portion from which objects are discharged, said second conveying means include a pair of laterally spaced movable supports which diverge in a direction toward said exit end portion whereby objects moving tapered ends first will pivot downwardly and become deposited upon said third conveying means with their tapered ends leading, said diverging movable supports define said second orienting means, and abutment means at said exit end portion against which will abut the larger ends of larger end leading objects on said second conveying means for stopping of said last-mentioned objects in their movement and depositing the same on said third conveying means with the tapered ends thereof leading.

28. The apparatus as defined in claim 22 wherein said second conveying means has an entrance end portion upon which objects are deposited and an exit end portion from which objects are discharged, said second conveying means include a pair of laterally spaced movable supports which diverge in a direction toward said exit end portion whereby objects moving tapered ends first will pivot downwardly and become deposited upon said third conveying means with their tapered ends leading, said diverging movable supports define said second orienting means, abutment means at said exit end portion against which will abut the larger ends of larger end leading objects on said second conveying means for stopping of said last-mentioned objects in their movement and depositing the same on said third conveying means with the tapered ends thereof leading, and said abutment means includes a curved surface defining a transition path of travel in a generally vertical plane between said exit end portion and said third conveying means.

29. The apparatus as defined in claim 22 including means for supporting said objects during the movement thereof between said first and second conveying means, a gap between said supporting means and said first curved guide surface through which may at least partially pass the larger ends of the objects, and said second curved guide surface being disposed adjacent said gap for contactingly intercepting objects passing through said gap incident to depositing said intercepted objects upon said second conveying means with the larger ends thereof leading.

30. The apparatus as defined in claim 26 including means for supporting said objects during the movement thereof between said first and second conveying means, a gap between said supporting means and said first curved guide surface through which may at least partially pass the larger ends of the objects, and said second curved guide surface being disposed adjacent said gap for contactingly intercepting objects passing through said gap incident to depositing said intercepted objects upon said second conveying means with the larger ends thereof leading.

31. The apparatus as defined in claim 27 including means for supporting said objects during the movement thereof between said first and second conveying means, a gap between said supporting means and said first curved guide surface through which may at least partially pass the larger ends of the objects, and said second curved guide surface being disposed adjacent said gap for contactingly intercepting objects passing through said gap incident to depositing said intercepted objects upon said second conveying means with the larger ends thereof leading.

32. The apparatus as defined in claim 28 including means for supporting said objects during the movement thereof between said first and second conveying means, a gap between said supporting means and said first curved guide surface through which may at least partially pass the larger ends of the objects, and said second curved guide surface being disposed adjacent said gap for contactingly intercepting objects passing through said gap incident to depositing said intercepted objects upon said second conveying means with the larger ends thereof leading.

* * * * *